United States Patent [19]

Hinks

[11] Patent Number: 5,011,164
[45] Date of Patent: Apr. 30, 1991

[54] DOUBLE-DISK, SPRING-BIASED MECHANICAL SEAL ASSEMBLY

[75] Inventor: Raymond W. Hinks, Transvaal, South Africa

[73] Assignee: Terratech Mining Services (PTY) Ltd., Bryanston, South Africa

[21] Appl. No.: 423,207

[22] Filed: Oct. 17, 1989

[30] Foreign Application Priority Data

Oct. 18, 1988 [ZA] South Africa .................. 88/7762

[51] Int. Cl.$^5$ ............................................. F16J 15/34
[52] U.S. Cl. ..................... 277/40; 267/141.4; 277/82
[58] Field of Search ............... 277/40, 41, 93 R, 93.50, 277/96, 164, 175, 235 R, 82, 84, 83, 92, 206 R; 267/141.1, 141.4, 141.5

[56] References Cited

U.S. PATENT DOCUMENTS

| 2,961,258 | 11/1960 | Donley et al. | 277/83 X |
|---|---|---|---|
| 3,180,650 | 4/1965 | Liebig | 277/235 X |
| 3,363,910 | 1/1968 | Toronchuk | 277/93 R X |
| 3,655,205 | 4/1972 | Peterson | 277/41 X |
| 3,938,812 | 2/1976 | Coleman | 277/41 |
| 4,157,404 | 11/1964 | Doble | 277/93 R |
| 4,294,953 | 10/1981 | Inouye et al. | 277/41 X |
| 4,418,919 | 12/1983 | Wentworth | 277/40 |
| 4,509,762 | 4/1985 | Garrett | 277/41 X |

FOREIGN PATENT DOCUMENTS

| 972282 | 6/1959 | Fed. Rep. of Germany | 277/83 |
|---|---|---|---|
| 2132622 | 1/1972 | Fed. Rep. of Germany | 277/96 |
| 73/5710 | 8/1973 | South Africa . | |

Primary Examiner—William A. Cuchlinski, Jr.
Assistant Examiner—Scott Cummings
Attorney, Agent, or Firm—Finnegan, Henderson, Farabow, Garrett & Dunner

[57] ABSTRACT

A mechanical seal arrangement for use in association with a pump casing structure and a drive shaft for driving a pump impeller which is housed in the pump casing structure. The mechanical seal arrangement has a rotatable seal ring with a seal face mountable concentrically on the drive shaft for rotation with the drive shaft. A non-rotatable seal ring is provided having a seal face mounted in axial alignment with the rotatable seal ring assembly. Biasing means are provided for urging the rotatable and non-rotatable seal rings axially towards each other for effecting sealing engagement of the seal faces of the respective seal rings. The biasing means has at least two disk spring elements spaced apart and encapsulated in an elastomeric body, with the biasing means being located in use in tensioned state between either one of the seal rings and the pump casing structure.

6 Claims, 3 Drawing Sheets

DOUBLE-DISK, SPRING-BIASED MECHANICAL SEAL ASSEMBLY

Mechanical seals for use in slurry pumps have in the past mainly comprised stuffing-box type seals. This is so because conventional mechanical seals, i.e. seals comprising a non-rotating seal ring mounted to the pump casing and a rotatable seal ring mounted concentrically on the drive shaft of the pump are very vulnerable to the highly abrasive and sometimes corrosive environment within the pump casing of a slurry pump, which abrasive or corrosive environment can join the close clearances and dynamic gasketry of their mechanisms. Another shortcoming of conventional types of mechanical seals for use in slurry pumps is their inability to operate effectively at elevated internal pump pressures, and are consequently restricted to use in relative low pressure centrifugal slurry pumps.

Some progress has however been made in recent times to adapt the conventional types of mechanical seals to make them suitable for use in slurry pumps. The most significant advancement in mechanical seal design for slurry pumps manifested itself in a feature which serves to balance the mechanical biassing force which urges the two sealing faces together with the forces which result from the hydraulic pressure prevailing inside the pump casing when the pump is operational.

In this way, sealing arrangements have been adapted to operate effectively at much higher pressures. The above problem has in the past been overcome by quantifying the hydraulic force vectors normally prevailing in an operative slurry pump and designing a biassing means, typically by making use of a disk spring arrangement which is adapted to exert a pre-determined net closing force on the seal faces when the pump is operational which is commensurate with the proper functioning of the seal.

The design improvements described above have led to marked improvements in sealing capability and operating life of mechanical seals for use in slurry pumps but the arrangements nevertheless suffer from certain disadvantages.

Firstly, in all of the known arrangements, a single disk spring is employed to urge the sealing faces together. This is usually done by mounting the disk spring either directly or indirectly on the drive shaft of the pump with the rotating seal ring located against it so that the rotating seal ring is urged towards the non-rotating seal ring by means of the disk spring. This arrangement has the disadvantage that the biassing means rotates with rotating seal ring causing undesireable effects due to centrifugal forces exerted on the biassing means.

Furthermore, the disk spring arrangement typically serves as a drive for the rotating seal face which causes additional forces to be applied on the disk spring and which consequently necessitates the provision of stronger and hence more expensive biassing means designs.

Another disadvantage of the above arrangements lies in the inadequate flexibility characteristics of a single disk spring arrangement used as biassing means for a mechanical seal. This factor becomes very important when the seals are to be used in slurry pumps and particularly slurry pumps for the mining industry. Slurry pumps for the mining industry are usually relatively crude machines due to the harsh environment in which they are required to operate. This often has the result that the drive shaft is misaligned to some extent with reference to the pump casing. If one considers that the rotating seal ring is mounted to the drive shaft and the non-rotating seal ring is mounted to the pump casing then it is obvious that a substantial degree of flexibility in the biassing means is essential in order to retain the sealing faces of the sealing rings in permanent sealing engagement with each other. In this regard, it has been found that a single disk spring arrangement is often inadequately flexible to accomodate the sometimes considerable variances in concentricity and squareness which prevails between the respective seal rings during each cycle of rotation. In the past, this has been overcome by expensive replacement or re-alignment modifications to the pump structure, but this is often not viable within the environment of a busy mining operation.

Furthermore, solid build-up in the pump casing when the pump has been inoperative for a period of time usually causes severe flexure or whipping of the drive shaft during start-up. This whipping action also has the effect of taking the seal rings out of concentricity and consequently the biassing means needs to be flexible enough to accomodate the flexure and to retain the seal faces in sealing engagement with each other during start-up.

It is accordingly an object of the present invention to provide an arrangement which applicant believes will overcome or at least minimize the problems and disadvantages of the known arrangements.

According to the invention, a mechanical seal arrangement for use in association with a pump casing structure and a drive shaft for driving a pump impeller which is housed in the pump casing structure comprises:

a rotatable seal ring having a seal face mountable concentrically on the drive shaft for rotation with the drive shaft;

a non-rotatable seal ring having a seal face mountable in axial alignment with the rotatable seal ring assembly; and biassing means for urging the rotatable and non-rotatable seal rings axially towards each other for effecting sealing engagement of the seal faces of the respective seal rings:

the arrangement being characterized therein that the biassing means comprises at least two disk spring elements spaced apart and encapsulated in an elastomeric body, the biassing means being locatable in use in a tensioned state between either one of the seal rings and the pump casing structure.

Preferably the biassing means is locatable in use in a tensioned state between the non-rotatable seal ring and the pump casing structure.

Preferably also two disk spring elements are encapsulated within the elastomeric body in back-to-back or series relationship.

In this specification and in the appended claims, the term "disk spring element" refers to mechanical spring in the form of a washer which is generally in the shape of a truncated cone, with both the base and the truncated ends of the core being open, and the term "series relationship" in respect of the disk spring elements means that the disk spring elements are arranged with their respective truncated ends extending towards each other.

The encapsulated disk spring elements are preferably mounted on a support ring.

Preferably also, the disk spring elements are retained spaced from each other within the elastomeric body by means of a pressure ring which is located on the support ring between the disk spring elements at their inner diameter regions.

The disk spring elements preferably comprise Belleville washers.

With the above arrangement therefore, the biassing means is non-rotational and urges the non-rotatable seal ring axially towards the rotatable seal ring. Furthermore, the elastomeric outer surface of the biassing means provides an effective secondary seal against leakage of fluids at the location where it abuts against the pump casing structure and at the location where it abuts against the non-rotatable seal ring.

Because use is made of two disk spring elements and rubber cushioning, the overall flexibility of the biassing means is greatly increased with the result that the biassing means is able to compensate for much more severe shaft vibrations, misalignments and flexures during start-up of the pump.

The support ring may feature at its ends radially extending abutment steps against which the inner diameters of the encapsulated disk spring elements abut, thereby retaining the biassing means on the support ring.

An end ring may in use be located between at least one of the abutment steps and the inner diameter of one of the encapsulated disk spring elements.

Alternatively, end rings may be shrink fitted to the ends of the support ring against which the inner diameters of the encapsulated disk spring elements abut, thereby retaining the biassing means on the support ring.

An adhesivr may furthermore be applied to the end rings and/or tne support ring to enchance the bonding between the end rings and the tubular support ring.

In one form of the invention the non-rotatable seal ring is bonded directly to the elastomeric body of the biassing means and the rotatable seal ring is bonded directly to a shaft sleeve which is fitted over the drive shaft.

The non-rotatable seal ring assembly preferably comprises a first carrier ring with a non-rotatable seal ring mounted thereon, and the pump casing structure preferably includes a pump casing and a cover ring which is mountable to the pump casing, the arrangement being characterized therein that in use, the biasssing means is located in a tensioned state between the first carrier ring and the cover ring.

The cover ring is preferably adjustable relative to the pump casing for adjusting the biassing force of the biassing means.

The rotatable seal ring assembly preferably comprises a a second carrier ring with a rotatable seal ring mounted thereon, the second carrier ring being mounted to a shaft sleeve which is fitted over the drive shaft.

Preferably also, an annular space is defined between the inner diameter of the cover ring and the outer diameter of the shaft sleeve, a setting collar being locatable in the annular space for locating the cover ring concentrically relative to the drive shaft.

The setting collar may be removably attachable to the shaft sleeve.

In a preferred form of the invention, the pump casing further includes an adaptor ring; the arrangement being characterised therein that the shaft sleeve, the second carrier ring with the rotatable seal ring, the first carrier ring with the non-rotatable seal ring, the cover ring, the adaptor ring and the setting collar are all removable from the drive shaft as a unit in cartridge form.

This invention will now be described in detail with reference to the accompanying drawings in which.

Figure 1:
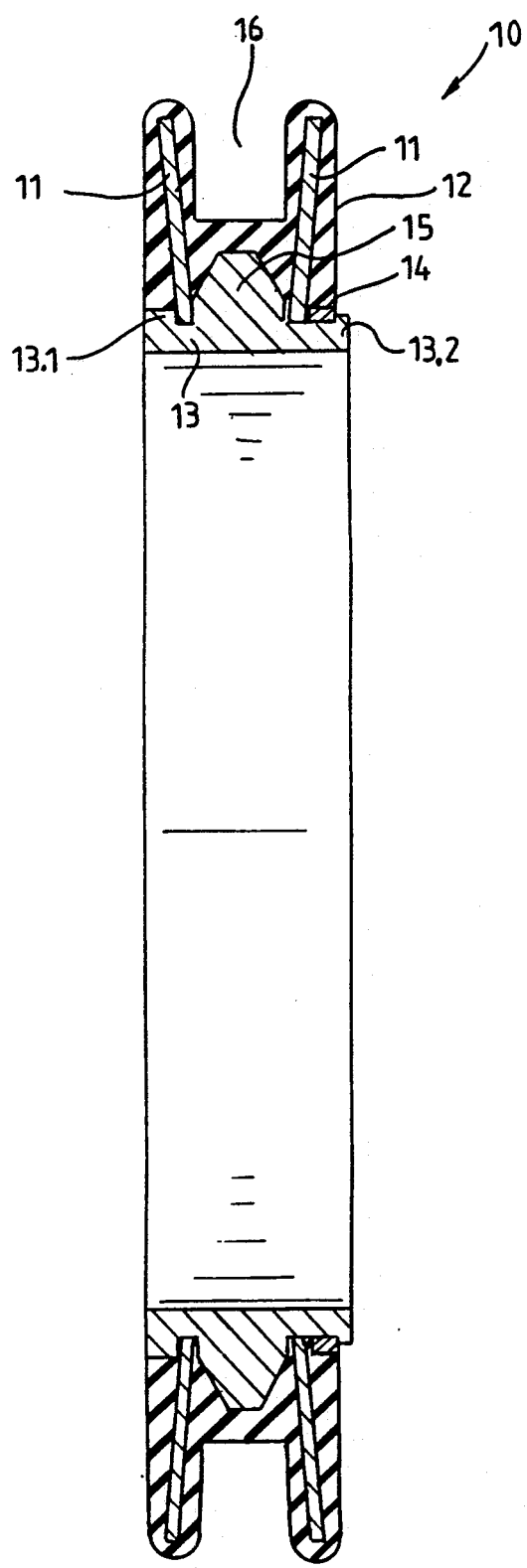
FIG. 1 is a sectioned side view of a biassing means forming part of the invention.

FIG. 1, biassing means 10 comprises two Belville washer type disk spring elements 11 arranged in series relationship as shown and encapsulated in an elastomeric body 12. The encapsulated disk spring elements 11 are mounted on a support ring 13, which is generally tubular in shape.

Support ring 13 features an abutment step 13.1 at its one end against which the inner diameter of the one disk spring elements 11 abuts in use. At the opposite end of support ring 13, a shallower abutment step 13.2 is provided which serves to locate an end ring 14. The inner diameter of the other disk spring element abuts against end ring 14 which is shrink fitted onto support ring 13 and held in position by abutment step 13.2 as shown. An adhesive or contact cement (not shown) may be applied to the support ring 13 and/or end ring 14 to enhance bonding. This arrangement ultimately serves to retain the encapsulated disk spring elements 11 securely on support ring 13.

A pivot formation 15, which forms part of support ring 13 as shown, is located between the two disk spring elements 11 to provide a pivot support for the elements 11 when they are tensioned and/or flexing. In use, the elastomeric body 12 is bonded by way of suitable cement (not shown) to most of the surface area of the disk spring elements 11. There is however no bonding between the outer surface of the pivot formation 15 and the elastomer in contact therewith and neither between the inner lower regions of the disk spring elements 11 and the elastomer in contact therewith.

The reason for this is to allow the elastomer to extrude unrestricted in the region of the pressure ring 15 between the disk spring elements 11 when the biassing means 10 is in a tensioned state. This arrangement accordingly provides for a higher degree of axial travel of the elements 11 relative to each other during normal operation and reduces the overall load transmitted by the biassing means 10 to a more manageable level.

The outer surface configuration of the elastomeric body 12 may be varied to provide suitable hydraulic balancing surfaces on the biassing means 10. This may be done by radially enlarging or reducing or varying the shape of the annular recess 16 between the outwardly extending disk spring elements 11.

Figure 2:
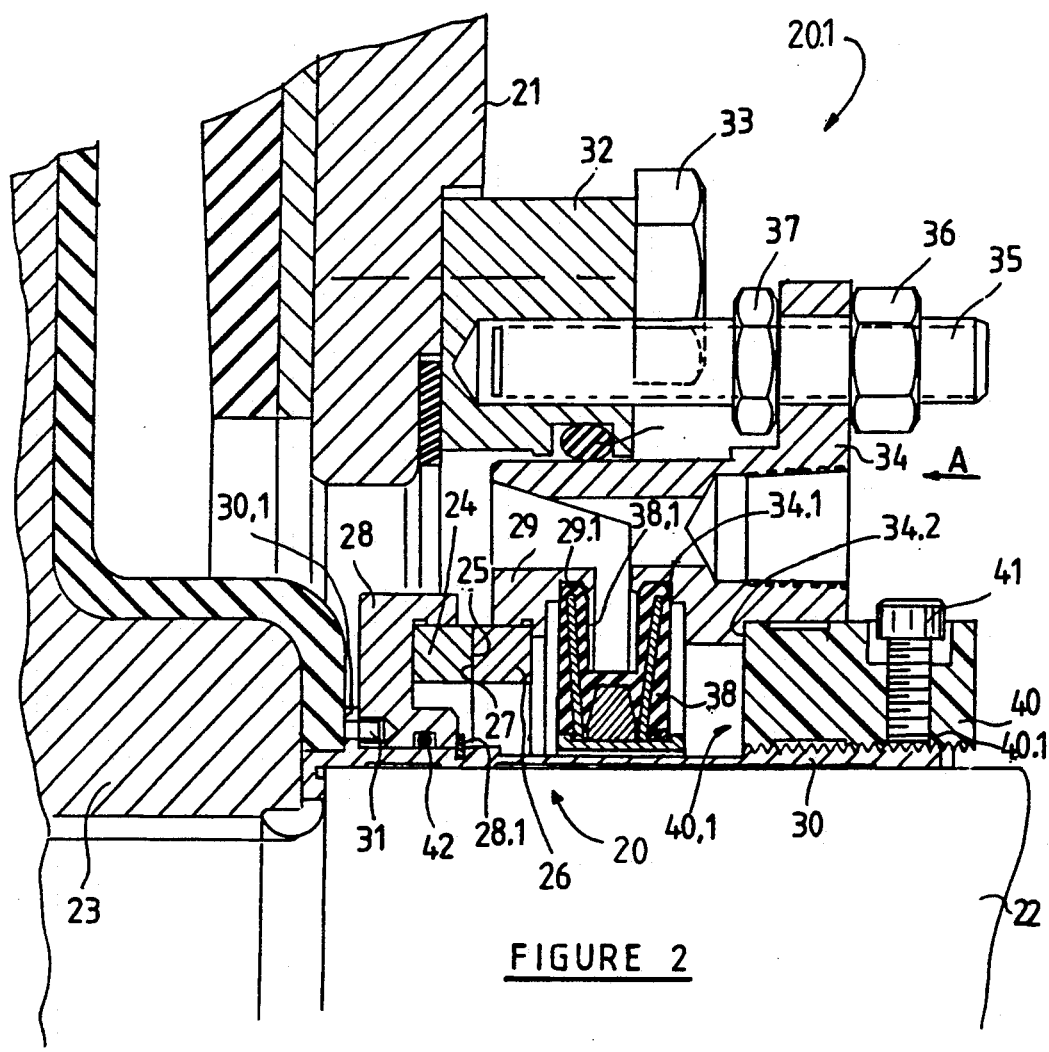
FIG. 2 is a quarter section of one embodiment of a mechanical seal assembly according to the invention including the biassing means of FIG. 1.

In FIG. 2, a mechanical seal 20 is used in association with pump casing structure 20.1 which includes a pump casing 21 and a drive shaft 22 which drives an impeller 23 housed within casing 21.

Seal 20 generally comprises a rotatable seal ring 24 having a seal face 25 and a non-rotatable seal ring 26 having seal face 27.

Rotatable seal ring 24 is mounted in a rotatable carrier ring 28 and non-rotatable seal ring 26 is similarly mounted in a non-rotatable carrier ring 29. The seal rings 24 and 26 may be mounted in their respective carrier rings my means of conventional shrink-fit or press-fit methods to provide drive transmission to the respective seal rings. Alternatively, they may be loose mounted and driven by drive pins (not shown). They may also be mounted by means of glue or cement (not shown).

A shaft sleeve 30 is provided over drive shaft 22. Shaft sleeve 30 features a radially outwardly extending flange 30.1 and rotatable carrier ring 28 is mounted to flange 30.1 by means of a plurality of drive pins 31 and complementary holes spaced circumferentially around the flange 30.1 and stationary carrier ring 28. Thus drive pins 31 provide the necessary drive coupling between drive shaft 22 and carrier ring 28 (via shaft sleeve 30). An O-ring 42 is provided between carrier ring 28 and shaft sleeve 30 as a static seal between the two elements. Carrier ring 28 is held is position on shaft sleeve 30 by means of a circlip 28.1.

An adaptor ring 32 is further provided which is bolted to pump casing 21 by means of bolts 33 and an adjustable cover ring 34 is mounted to adaptor ring 32 by means of three threaded shafts 35, nuts 36 and lock nuts 37 as shown.

In use, biassing means 38 which is of the kind as shown in FIG. 1 is located in a tensioned state between non-rotatable carrier ring 29 and cover ring 34 which forms part of the pump casing structure 20.1. Both carrier ring 29 and cover ring 34 feature recess formations 29.1 and 34.1 respectively which are complementary to the outer diameter of the biassing means 38 on either side thereof for static sealing engagement with the biassing means. The biassing means 38 is thus anchored to the carrier ring 29 and cover ring 34 by way of frictional abutment, and this eliminates the necessity to provide mechanical anchoring arrangements such as drive pins, lugs etc.

An O-ring 39 is provided as a static seal between adaptor ring 32 and cover ring 34.

The entire seal ring assembly is in cartridge form and may be installed as a unit over drive shaft 22. Once installed, cover ring 34 is sufficiently advanced in direction A to apply a pre-determined compression loading on biassing means 38 whereafter lock nuts 37 are tightened to retain cover ring 34 in position. As and when required, for example when seal faces 25 and 27 have worn appreciably, cover ring 34 may be advanced further to bring biassing means 38 to the required compression loading. This may be done while the pump is in operation.

In use, the biassing means 38 urges non-rotatable seal ring 26 towards rotating seal ring 24 (mechanical closing force) which effects sealing engagement of the seal faces 25 and 27. However, during normal operation of the pump, a thin film of fluid, (not shown), is present between seal faces 25 and 27 which positively acts to urge the seal faces away from each other (hydraulic opening force). The presence of the fluid film is necessary to provide lubrication and cooling to the seal faces, and an absence of fluid between the seal faces will result in rapid failure of the seal due to friction and over-heating of the lapped seal faces 25 and 27.

Furthermore, any hydraulic fluid pressure within the pump casing 21 will provide an hyraulic closing force on surface 38.1 of biassing means 38. This hydraulic closing force will obviously be complementary to the mechanical closing force. It would be undesireable if this hydraulic closing force becomes excessive since it could cause the fluid film (not shown) to be expelled completely from between the seal faces 25 and 27, which will result in dry contact between the seal faces and consequently early failure as outlined above. It is thus intended that the surface area 38.1 be pre-determined to allow the hydraulic closing force acting on that surface to be of the same magnitude as the hydraulic opening force acting in the opposite direction between the seal faces 26 and 27. When this is achieved, the mechanical closing force applied by the disc springs represents the net closing force remaining after the hydraulic opening and closing forces have been balanced out.

Figure 3:
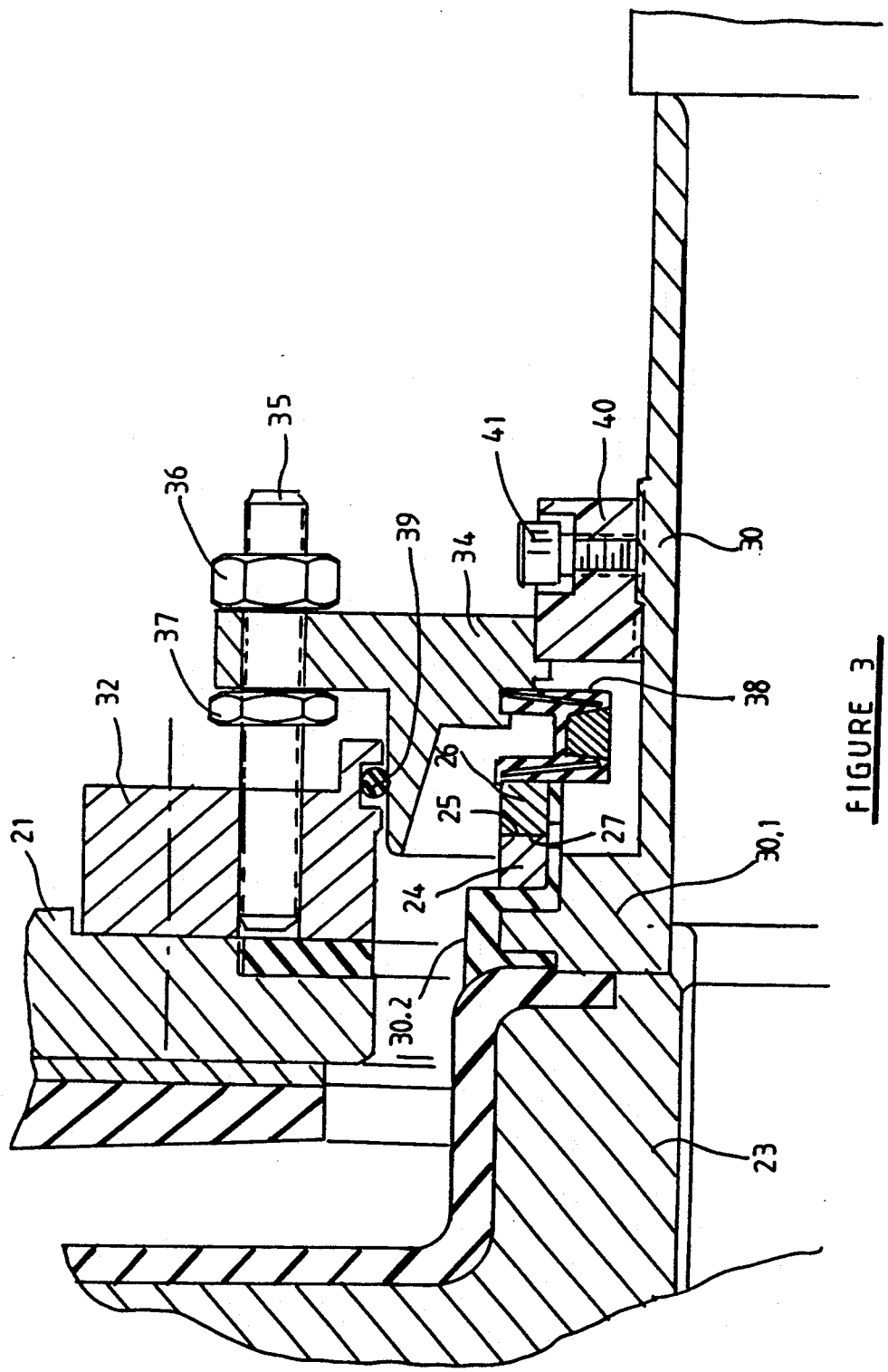
FIG. 3 is a quarter section of an alternative embodiment of a mechanical seal assembly according to the invention, including the biasing means of FIG. 1.

In FIG. 3, seal ring 26 is bonded by way of vulcanizing directly to the elastomeric body of biasing means 38. This is achieved by moulding seal ring 26 in place during the manufacturing process of biasing means 38. This variation dispenses with the necessity to provide a carrier ring 29 (see FIG. 2).

Furthermore, in this embodiment, flange 30.1 is enlarged when compared to flange 30.1 shown in the embodiment of FIG. 2. The carrier ring 28 shown in FIG. 2 is replaced by an elastomeric collar 30.2 which is bonded by vulcanizing to seal ring 24 and flange 30.1 of shaft sleeve 30. With this arrangement, the drive pins 31, O-ring 42 and circlip 28.1 shown in the embodiment of FIG. 2 are all redundant.

Referring again to FIG. 2, a further requirement for proper operation of the mechanical seal is that the non-rotatable seal ring 26 must be axially aligned with rotatable seal ring 24, and they must both be concentric with drive shaft 22.

Concentricity and axial alignment of the seal faces may be achieved by means of a threaded plastic setting collar 40 which fits, in use, in the annular space 40.1 defined between the inner diameter of cover ring 34 and the outer diameter of shaft sleeve 30. Setting collar 40, which features a threaded bore 40.1, is advanced axially along a threaded portion of shaft sleeve 30. In use, setting collar 40 is fully advanced until it abuts against the complementary recess 34.2 along the inner diameter of cover ring 34 as shown. When in this position, the sub-assembly comprising the shaft sleeve 30, carrier ring 29, biassing means 38, cover ring 34, adaptor ring 32 and setting collar 40 is in cartridge form, and may be removed from the end of drive shaft 22 for purposes of maintainance, and a new or repaired sub-assembly may be fitted to the shaft 22 in cartridge form.

In practise, the sub-assembly as described above is pre-assembled on a work bench. The collar 40 is advanced until it abuts against recess 34.2 of cover ring 34. A further slight compression pre-loading of approximately one quarter turn is applied purely nominally to load the seal faces 25 and 27 by compressing the biassing means 38. The collar 40 will be secure in this position due to the pre-loading force applied on it by the biassing means 38. The adaptor ring 32 is retracted as far as it will go towards cover ring 34 and retained in that position by adjusting nuts 37 and 36. At this point, the assembly is in cartridge form and is ready to be mounted over the end of drive shaft 22.

The pump casing 21 and impeller 23 is mounted to the end of drive shaft 22 in the conventional manner once the sub-assembly is in place.

The cartridge sub-assembly, once mounted to shaft 22, is not touched until the pump casing 21 is completely fitted and all pipework and fastenings (not shown) completed. Once this has been completed, adaptor ring 32 is advanced to pump casing 21 (by adjusting nuts 36 and 37) and fastened thereto by way of bolts 33.

Nuts 36 are next advanced against cover ring 34 to effect the desired final compression loading on the seal faces 25 and 27. Lock nuts 37 are tightened against cover ring 34 to lock the cover ring 34 in the desired position.

Once this has been done, collar 40 is retracted from under cover ring 34 and cap screw 41 may be tightened on a non-threaded portion (not shown) of shaft sleeve 30 to keep it clear from cover ring 34 during normal operation of the pump. By this method non-rotatable seal ring 24 is perfectly aligned with rotatable seal ring 24 and is furthermore concentric with drive shaft 22 regardless of any misalignments or out of squareness of pump casing 21 with respect to shaft 22.

It will be appreciated that many modifications or variations of the invention are possible without departing from the scope of the appended claims.

I claim:

1. A mechanical seal arrangement for use in association with a pump casing structure and a drive shaft for driving a pump impeller which is housed in the pump casing structure, the seal arrangement comprising:
    a rotatable seal ring having a seal face mountable concentrically on the drive shaft for rotation with the drive shaft;
    a non-rotatable seal ring having a seal face mountable in axial alignement with the rotatable seal ring; and
    biasing means for providing a biasing force to urge the rotatable and non-rotatable seal rings axially towards each other for effecting sealing engagement of the seal faces thereof; the arrangement being characterized by the biasing means comprising at least two disk spring elements spaced apart and encapsulated in an elastomeric body, which defines in use a pressure surface against which a fluid may exert a force complementary to the biasing force of the biasing means, the biasing means being locatable in a tensioned state between either one of the seal rings and the pump casing structure; and by the non-rotatable seal ring being bonded directly to the elastomeric body of the biasing means, with the rotatable seal ring being bonded directly to a shaft sleeve fitted over the drive shaft.

2. A mechanical seal arrangement as claimed in claim 1 including a first carrier ring to which the non-rotatable seal ring is mounted; the pump casing structure further including a pump casing and a cover ring which is mountable to the pump casing, the arrangement being characterized therein that in use, the biasssing means is located in a tensioned state between the first carrier ring and the cover ring.

3. A mechanical seal arrangement as claimed in claim 2 wherein the cover ring is adjustable relative to the pump casing for adjusting the biassing force of the biassing means.

4. A mechanical seal arrangement as claimed in claim 2 wherein an annular space is defined between the inner diameter of the cover ring and the outer diameter of the shaft sleeve, a setting collar being locatable in the annular space for locating the cover ring concentrically relative to the drive shaft.

5. A mechanical seal arrangement as claimed in claim 4 wherein the setting collar is removably attachable to the shaft sleeve.

6. A mechanical seal arrangement as claimed in claim 5 wherein the pump casing structure further includes an adaptor ring, and wherein the shaft sleeve; the second carrier ring with the rotatable seal ring; the first carrier ring with the non-rotatable seal ring; the cover ring; the adaptor ring and the setting collar are removable from the drive shaft as a unit in cartridge form.

* * * * *